United States Patent

[11] 3,624,153

[72] Inventors: Edward J. Lynch, Danville; William J. Flom, Walnut Creek, both of Calif.
[21] Appl. No.: 16,728
[22] Filed: Mar. 5, 1970
[45] Patented: Nov. 30, 1971
[73] Assignee: The Dow Chemical Company, Midland, Mich.

[54] SEPARATION OF ACRYLAMIDE FROM ACRYLAMIDE SULFATE
3 Claims, 3 Drawing Figs.

[52] U.S. Cl. .................................................. 260/561 N
[51] Int. Cl. ............................................... C07c 103/00
[50] Field of Search .................................... 260/561 N

[56] References Cited
UNITED STATES PATENTS

| | | | |
|---|---|---|---|
| 3,324,180 | 6/1967 | Beer et al. | 260/561 |
| 3,008,990 | 11/1961 | Weiss | 260/561 |

Primary Examiner—Lewis Gotts
Assistant Examiner—Ethel G. Love
Attorneys—Griswold & Burdick, D. H. Thurston and C. E. Rehberg ABSTRACT: In the process for making acrylamide by reacting acrylonitrile with concentrated sulfuric acid and neutralizing the resulting acrylamide sulfate with ammonia, efficient separation of acrylamide is obtained by adding a relatively small amount of tert-butyl alcohol or a propanol to the neutralized mixture. The mixture thereby obtained separates into an alcohol layer which is largely an alcoholic solution of acrylamide with some water present, an aqueous phase which is essentially a saturated solution of ammonium sulfate, and solid ammonium sulfate.

PATENTED NOV 30 1971

INVENTORS.
Edward J. Lynch
BY William J. Flom

Griswold & Burdick
ATTORNEYS

SEPARATION OF ACRYLAMIDE FROM ACRYLAMIDE SULFATE

BACKGROUND OF THE INVENTION

This invention relates to an improved chemical process and it particularly concerns an advantageous new method for separating pure acrylamide from an acrylonitrilesulfuric acid reaction mixture which has been neutralized with ammonia.

The process whereby acrylonitrile is converted to acrylamide by reaction with sulfuric acid in the presence of water is well known and numerous methods for separating acrylamide form the acid reaction mixture have been described. The hydrolysis reaction is conveniently carried out by reacting acrylonitrile at a moderate temperature, e.g. 20°–50° C. with an equal number of moles or slight excess of sulfuric acid of about 75–98 percent concentration. A polymerization inhibitor such as a copper or iron sulfate may also be present. The resulting reaction mixture is then neutralized by addition of a base to produce an essentially neutral mixture of free acrylamide and an inorganic sulfate together with minor amounts of byproducts such as acrylic acid and whatever additive or additives which may have been employed. Ammonia is a commonly used base for the neutralization.

A number of expedients have been used to separate the largest possible amount of acrylamide of optimum purity from this neutralized mixture. The mixture has been diluted with sufficient water to form a homogeneous solution and extracted with a water-insoluble solvent, whereby a solvent solution of acrylamide is obtained. A mixture of water and a water-miscible organic solvent has been added to precipitate the inorganic salt and form an aqueous organic solvent solution of acrylamide. The reaction mixture has been cooled to produce mixed crystals of ammonium sulfate and acrylamide, from which acrylamide is extracted with methanol. Alternatively, the neutralization step has been carried out in an organic solvent medium, precipitating the inorganic sulfate and forming a solvent solution from which the dissolved acrylamide can be recovered by crystallization or evaporation of the solvent. None of these methods has been completely satisfactory.

SUMMARY OF THE INVENTION

It has now been found that in the process wherein acrylamide is made by reacting a mole of acrylonitrile with at least one mole of concentrated sulfuric acid and neutralizing the acidic reaction mixture with ammonia to obtain essentially an aqueous mixture of acrylamide and ammonium sulfate, high recoveries of pure acrylamide are obtained by adjusting the aqueous mixture to pH 2–7, a water content of 1.2–1.6 parts per part by weight of acrylamide, and a temperature of 10°–50° C., and adding 0.05–0.5 parts by weight based on the total weight of the other components of isopropyl alcohol, n-propyl alcohol, tert-butyl alcohol, or mixture thereof. Under these conditions, a three phase system is formed with the separation of two liquid phases, an upper liquid layer which is essentially an aqueous alcoholic solution of acrylamide and a lower liquid layer which is essentially a saturate aqueous solution of ammonium sulfate. Undissolved ammonium sulfate, which is the major portion of the total salt present, forms a solid third phase which remains at the bottom of the aqueous layer and this solid is thereby kept from contact with the upper organic layer. Separation of the upper layer and isolation of the dissolved acrylamide is easily accomplished by any conventional means such as decantation followed by crystallization or evaporation of the solvent.

Figure 1:
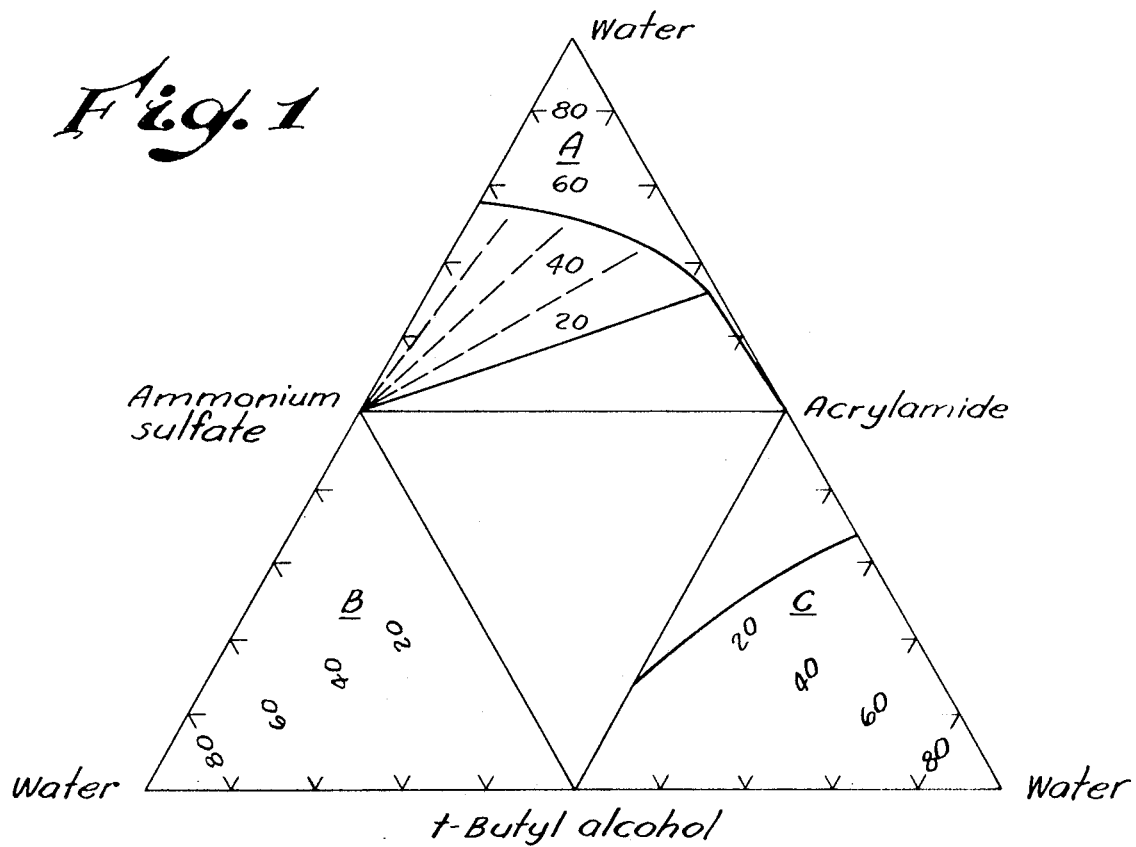
FIG. 1 is a composite of three three-component phase diagrams, section A representing the water-ammonium sulfate-acrylamide system, section B representing the water-ammonium sulfate-tert-butyl alcohol system, and section C representing the water-acrylamide-tert-butyl alcohol system, all values having been determined at 30° C.
Figure 2:
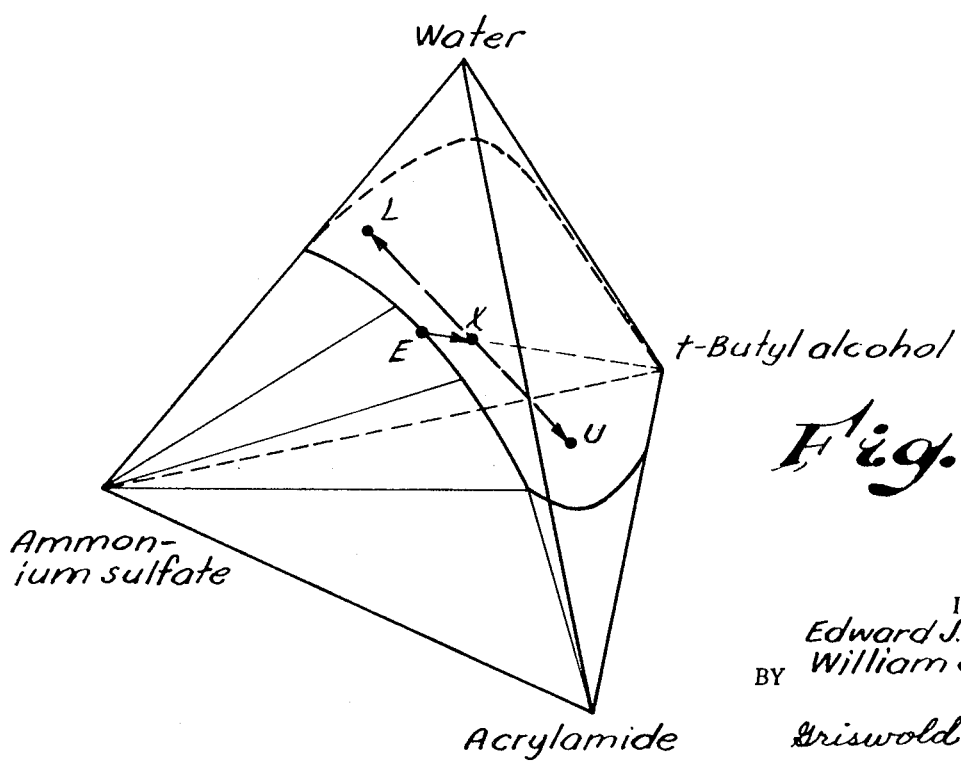

By joining the three vertexes of FIG. 1, there is formed the tetrahedral four-component phase diagram represented in FIG. 2. This diagram illustrates the compositions of phases formed in the practice of the present invention. For example, Point E represents the composition of an aqueous acrylamide-ammonium sulfate solution resulting from the neutralization with ammonia of an acrylonitrile-sulfuric acid hydrolysis product. Addition of 8 percent tert-butyl alcohol brings the composition to Point X where the composition separates into two phases, an upper phase having the composition U and a lower phase having the composition L.

When isopropyl alcohol or N-propyl alcohol is used as the alcohol component, the resulting systems are represented by similar phase diagrams.

Figure 3:
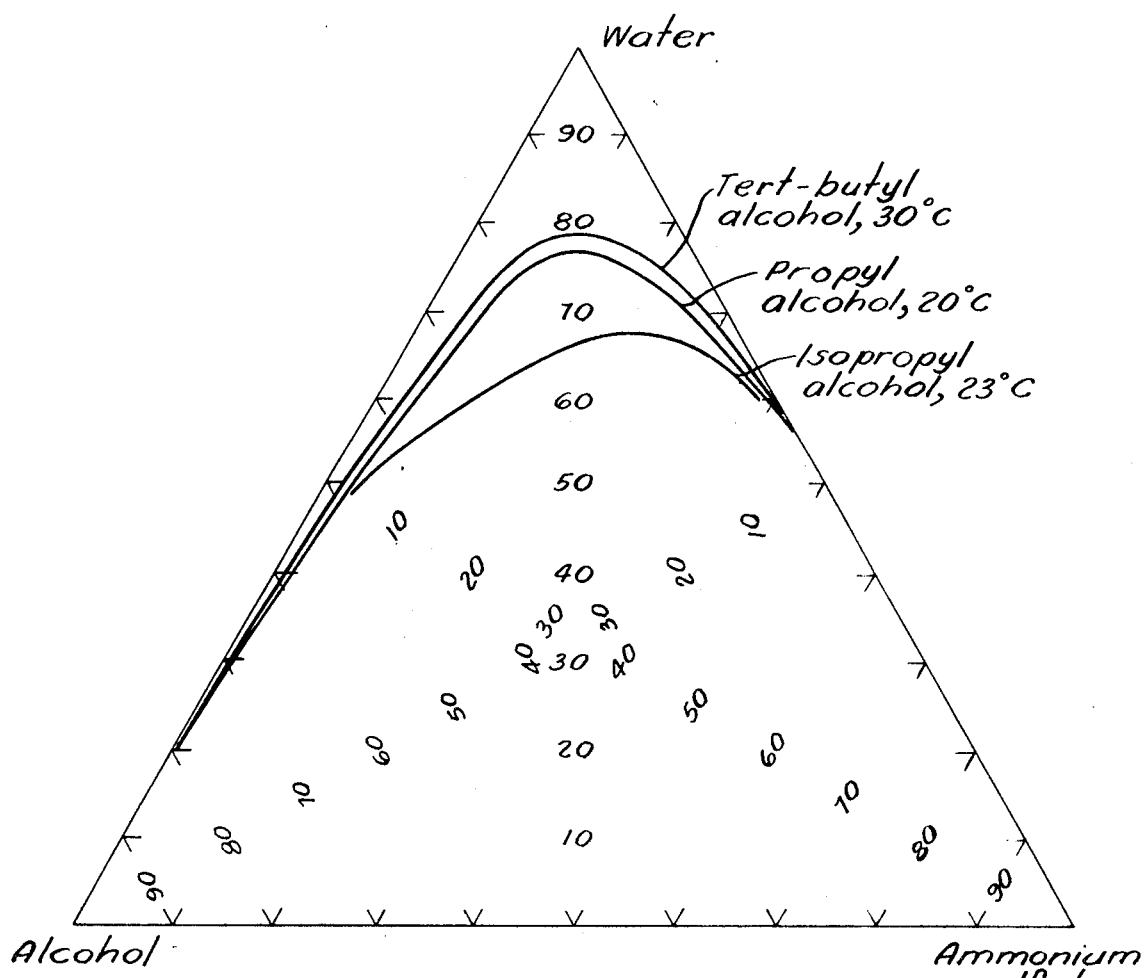

FIG. 3 shows the phase diagrams of the alcohol-water-ammonium sulfate systems, section B in FIG. 1.

DETAILED DESCRIPTION

The unexpected feature which distinguishes this invention from superficially similar separation procedures of the prior art is the use of an organic solvent which is ordinarily miscible in all proportions with water under conditions such that two distinct liquid phases are formed in the presence of solid ammonium sulfate as described above, and that from this multiphase system, both acrylamide and ammonium sulfate are easily recoverable in high yield and optimum purity. The conditions necessary to provide these results include the choice of an aliphatic alcohol solvent as defined above and particularly the use of quantities and relative proportions of alcohol and water in the system to produce the described phase separation.

Any of the three alcohols or mixtures thereof are operable in the process and give acceptable results, but tert-butyl alcohol is the preferred organic solvent because of its lower capacity for dissolving ammonium sulfate and the fact that it is essentially inert in the subsequent polymerization of acrylamide containing it as a minor impurity. These alcohols offer several advantages over other organic solvents. For example, in a process using a water-miscible solvent such as methanol; a single liquid phase is formed and a washing step is required to remove this acrylamide-rich solution from the solid ammonium sulfate. When a partially water-soluble or water-insoluble solvent is employed for the separation, the solubility of acrylamide in the solvent is relatively low and considerably larger volumes of solvent are needed for the same weight of acrylamide.

In the detailed operation of the process, the starting reaction mixture is obtained by any of known procedures where in a mole of acrylonitrile is contacted with 1–1.5 moles, preferably 1–1.1 moles of sulfuric acid of 75–98 percent concentration at a conventional reaction temperature, usually about 80°–110° C., thereby forming a mixture of acrylamide sulfate, a little water, and any unreacted acrylonitrile and excess acid. A polymerization inhibitor is also usually present as previously noted. This reaction mixture is then neutralized by addition of ammonia in about the stoichiometric amount of 2 moles per mole of sulfuric acid base on the acid originally present to make a neutralized mixture of pH 2–7, preferably pH 5–6.5. Neutralization is ordinarily done at about or slightly above ambient temperature to minimize thermally initiated polymerization. At this point, unreacted acrylonitrile is preferably flashed off under reduced pressure and about ambient temperature to remove substantially all of this material which otherwise may contaminate the final acrylamide product.

The water content is adjusted if necessary to a content of 1.2–1.6 parts by weight per part of acrylamide, preferably to about 1.4–1.6 parts of water. The minimum quantity of water is that necessary to provide sufficient aqueous phase to cover the solid ammonium sulfate after addition of alcohol. The alcohol of choice is added to the mixture at this time also in a quantity of 0.05–0.5 parts by weight based on the neutralized slurry plus any added water, preferably about 0.1–0.25 parts of alcohol. At a temperature of 10°–50° C., preferably 30°–40° C., the resulting mixture as previously described contains an upper liquid phase which is essentially an alcohol solution of nearly all of the acrylamide present plus minor quantities of water and ammonium sulfate, a lower liquid phase which is essentially saturated aqueous ammonium sulfate with very small amounts of acrylamide and alcohol present, and solid ammonium sulfate representing the greater portion of that material as a substantially pure material.

The upper liquid phase is easily separated and the acrylamide can be recovered as a relatively pure compound by any convenient means. A preferred procedure includes evaporative crystallization in which the alcohol can be recovered and distilled for recycle to the process. Since all of the alcohols useful in the process form water azeotropes containing 72–88 percent of alcohol, recovered alcohol is ordinarily recycled as the water azeotrope. The solid ammonium sulfate can be recovered by filtration of the lower liquid phase and it contains so little acrylamide that it can be dried and packaged for commercial use without further treatment. The filtrate is advantageously returned directly to the process at the neutralization step.

EXAMPLE 1

A synthetic acrylamide process mixture with added alcohol was prepared by combining 10 g. of acrylamide, 19.6 g. of ammonium sulfate, 15.5 g. of water, and 4 g. of isopropyl alcohol and agitating the mixture at room temperature until it came to equilibrium. The mixture separated into two liquid phases, an upper primarily organic phase of about 25.5 ml. and a lower aqueous phase of about 7 ml. There was 15.4 g. of undissolved ammonium sulfate. Analysis of the liquid layers for ammonium sulfate showed 6.2 percent by weight in the upper layer and 33.5 percent in the aqueous phase. The aqueous layer also contained about 3 percent of acrylamide. In actual operation, the solid ammonium sulfate is separated from the lower liquid phase and the mother liquor is recycled to the neutralization step. In this way, an overall recovery of 99.8 percent of the theoretical amount of acrylamide can be realized. The product is 86 percent acrylamide with the major impurity being ammonium sulfate.

EXAMPLE 2

A similar mixture was made up as in example 1 with the same quantities of materials but using tertiary butyl alcohol as the organic solvent. This mixture also formed two liquid layers with 14.6 g. of solid ammonium sulfate. The upper (organic) phase amounted to 21 ml. and contained 3 percent by weight of ammonium sulfate. The aqueous lower layer (12 ml.) contained about 35 percent ammonium sulfate and 7.2 percent acrylamide. In actual operation as described in example 1, separation of solid ammonium sulfate and recycle of the mother liquor provides a 99.5 percent recovery of acrylamide as a product of 95 percent purity.

Comparable results are obtained when n-propyl alcohol is used as the alcohol component in the above procedures. Similar results are produced when the alcohol component is a mixture of two or all three of the above alcohols. Mixtures of these alcohols in any proportion are suitable.

EXAMPLE 3

A commercial acrylamide process mixture is neutralized with ammonia to about pH 7 and then contains 10 parts by weight of acrylamide, 20 parts of ammonium sulfate, 14 parts of water, and small amounts of ammonium acrylate and unreacted acrylonitrile. The acrylonitrile is flashed off at about 30° C. and 25 mm. Hg. At this point 2.2–22 parts of tert-butyl alcohol as its water azeotrope are added to the mixture. A three-phase system forms with an upper liquid phase which is an alcoholic solution containing better than 90 percent of the total acrylamide and a smaller lower liquid phase which is essentially saturated aqueous ammonium sulfate solution. Most of the ammonium sulfate is present as a solid bottom phase. The aqueous acrylamide solution is separated from the rest of the mixture and concentrated by evaporation. Pure acrylamide is recovered by crystallization and the tert-butyl alcohol is recovered by condensation of the evaporated vapors and distillation from the mother liquor and is returned to the process, essentially as its water azeotrope.

We claim:

1. In the process for making acrylamide by reacting acrylonitrile with at least 1 mole equivalent of sulfuric acid and substantially neutralizing the acid reaction mixture with ammonia to form an aqueous mixture of acrylamide and ammonium sulfate, the improvement wherein the neutralized aqueous mixture is adjusted to pH 2–7, a water content of 1.2–1.6 parts per part by weight of acrylamide, and 0.05–0.5 part based on the total weight of the other components of n-propyl alcohol, isopropyl alcohol, tert-butyl alcohol or mixture thereof is incorporated into the aqueous mixture, thereby forming at 10°–50° C. a three-phase mixture containing an upper liquid phase consisting essentially of an alcoholic solution of acrylamide, a lower liquid phase consisting essentially of an aqueous solution of ammonium sulfate, and solid ammonium sulfate, and separating said upper liquid phase.

2. The process of claim 1 wherein the alcohol is tert-butyl alcohol.

3. The process of claim 1 wherein the pH is 5.6–6.5, the water content is 1.4–1.6 parts per part of acrylamide, and the alcohol content is 0.1–0.5 parts based on the total weight of the other components.

* * * * *

PO-1050
(5/69)

UNITED STATES PATENT OFFICE
CERTIFICATE OF CORRECTION

Patent No. 3,624,153            Dated 30 November 1971

Inventor(s) Edward J. Lynch and William J. Flom

It is certified that error appears in the above-identified patent and that said Letters Patent are hereby corrected as shown below:

In column 1, line 13, delete "form" and insert -- from --; line 14 delete "conveniently" and insert -- conventionally --; line 15 delete "20°-50°" and insert --20°-150°--.

Signed and sealed this 30th day of May 1972.

(SEAL)
Attest:

EDWARD M. FLETCHER, JR.          ROBERT GOTTSCHALK
Attesting Officer                   Commissioner of Patents